United States Patent [19]
Johnson

[11] 4,194,923
[45] Mar. 25, 1980

[54] CAR WASHING METHOD AND APPARATUS

[76] Inventor: Archie L. Johnson, 3801 W. Orangewood, Phoenix, Ariz. 85021

[21] Appl. No.: 924,797

[22] Filed: Jul. 14, 1978

[51] Int. Cl.² ............................................. B08B 7/00
[52] U.S. Cl. ........................................ 134/6; 134/18; 15/53 AB; 15/DIG. 2
[58] Field of Search ............... 15/53 AB, 53 A, 53 R, 15/DIG. 2; 134/18, 6, 32

[56] References Cited
U.S. PATENT DOCUMENTS

| | | | |
|---|---|---|---|
| 3,238,551 | 3/1966 | Crino et al. | 15/DIG. 2 |
| 3,310,824 | 3/1967 | Beer | 15/53 AB |
| 3,350,733 | 11/1967 | Hanna | 15/53 AB |
| 3,624,851 | 12/1977 | Barber | 15/53 AB |
| 3,731,331 | 5/1973 | Haley et al. | 15/53 AB |
| 3,793,663 | 2/1974 | Lieffring | 15/DIG. 2 |

*Primary Examiner*—S. Leon Bashore
*Assistant Examiner*—Michael Goldman
*Attorney, Agent, or Firm*—Cahill, Sutton & Thomas

[57] ABSTRACT

Method and wrap around car wash apparatus are disclosed for maintaining uniform crush pressure of a rotary brush against a predetermined surface area of an advancing vehicle. A constant counterclockwise torque is produced on an outer arm by means of a rotating gear connected to the outer arm and a rack driven by a first pneumatic cylinder. After the rotary brush passes around the front edge of the vehicle, an inner arm pivotally connected to a support and the outer arm rotates counterclockwise until a maximum knuckled relationship between the inner and outer arms is attained. As the rotary brush, rotating clockwise, passes around the rear of the vehicle, the rotary brush bites into the rear corner producing a reaction force which causes the inner arm to be forced counterclockwise against a compression spring. The compression spring then boosts the inner arm in the clockwise direction, causing the rotary brush to be pushed into the rear end of the vehicle. The inner arm is then rotated clockwise to push the rotary brush against the rear end of the vehicle as the outer arm rotates counterclockwise, passing the rotary brush along the rear end of the vehicle. A telescoping member parallel to the inner arm and connected between an intermediate point of the outer arm and the support limits clockwise rotation of the outer arm as a function of clockwise rotation of the inner arm.

18 Claims, 11 Drawing Figures

CAR WASHING METHOD AND APPARATUS

FIELD OF THE INVENTION

The invention relates to car washing systems and methods, and more particularly, to wrap around car washing systems and methods involving a rotary brush supported by an outer arm pivotally connected to an inner arm.

DESCRIPTION OF THE PRIOR ART

Modern automatic car wash installations typically include arrangements of complex and expensive equipment necessary to perform various cleaning functions, including water jets for wetting down and rinsing a vehicle being washed, soap applicators, complicated scrubbing brushes mounted on articulated arms, wheel and tire cleaning brushes, wax applicators, friction curtains, water strippers, and dryers laid out along a path to perform sequential operations on the vehicle being washed. The vehicle is advanced slowly through such an installation by means of a conveying system. Various washer units positioned on either side of the vehicle path and having main rotary scrubbing brushes mounted on articulated arms are known in the art. Usually, the rotary brush is supported by a free end of a member known as an "outer arm", also referred to as a "secondary arm". The outer arm is pivotally connected to a free end of an "inner arm", also referred to as a "primary arm". The inner arm is pivotally connected to a support. The main rotary brushes of prior washer units are pressed against the front end, sides, and rear end of the advancing vehicle being washed, producing a "crush pressure" sufficient to ensure adequate scrubbing of the vehicle surfaces without stalling motor units connected to drive the rotary brushes. Such water units are referred to as "wrap around" washer units to distinguish them from washer units which wash only one surface, such as a rear surface or a side surface, of a vehicle. The washer units referred to hereinafter are understood to be of the wrap around variety. The "crush pressure" is the pressure produced between the rotary brush and the surface of the vehicle. The known washer units are massive, complex devices which are expensive to construct and maintain.

It is therefore an object of the invention to provide a less complex, less expensive, and more easily maintained car washing system than car washing systems of the prior art.

Prior washer units have the shortcoming that they produce undesirably non-uniform crush pressures, and consequently, non-uniform washing. The crush pressure in prior washer units is generally produced by various pneumatic cylinders which apply rotational forces to the inner arms and outer arms, thereby pressing the rotary brush against the surfaces of the vehicle being washed. The most serious shortcoming of known washer units is their inability to maintain adequate crush pressure during the operation of scrubbing the rear end of the vehicle. In order to adequately scrub the rear end of the vehicle being washed, the rotary brush must "chase" the rear end of the vehicle, as it "retreats" after the rotary brush has passed around the rear corner of the vehicle and begins to move across the rear end of the vehicle. The prior art washer units generally have relatively short "chase distance". The chase distance is the distance through which the rotary brush "follows" the rear end of the retreating vehicle while maintaining adequate crush pressure to effect suitable scrubbing of the retreating rear end.

Accordingly, it is another object of the invention to provide a car washing system and method which wash the rear end surface of a retreating vehicle more efficiently than car washing systems and methods of the prior art.

It is another object of the invention to provide a car washing system and method providing substantially greater chase distance than car washing systems of the prior art.

It is another object of the invention to provide a car washing system and method producing greater crush pressure throughout the chase distance than car washing systems and methods of the prior art.

It is another object of the invention to provide a car washing system and method maintaining a substantially uniform crush pressure along a predetermined surface of a vehicle being washed.

It is another object of the invention to provide a car washing system and method which can rotate the outer arm more than approximately eighty degrees with respect to the inner arm, maintaining predetermined torques on the outer arm during such rotation.

One car washer unit is disclosed in U.S. Pat. No. 3,310,824 (Beer) wherein the inner arm is rotated by means of a first pneumatic cylinder connected between a rigid support and an intermediate point of the inner arm. The outer arm is rotated relative to the inner arm by means of a second pneumatic cylinder connected between intermediate points of the inner arm and the outer arm. Operation of the mechanism is heavily dependent upon friction produced between the rotary brush and the surfaces of the vehicle being washed. The inner arm undergoes only approximately thirty degrees of rotation as the vehicle is being washed. Most of the movement of the rotary brush as it passes through the chase distance is produced by rotation of the outer arm. The chase distance is quite short and the crush pressure is highly non-uniform and inadequate as the rotary brush crosses the rear of the retreating vehicle, due to a reduction in leverage between the inner arm and the outer arm produced by the second pneumatic cylinder as the angle between the inner arm and the outer arm increases.

Another car washing device is disclosed in U.S. Pat. No. 3,350,733 (Hanna), wherein rotation of the inner arm and outer arm depends heavily upon frictional force produced between the vehicle and the rotary brush. The crush pressure is nonuniform, due to changing leverage produced between the inner arm and outer arm as the angle between the inner arm and outer arm varies. If the rotary brush is not rotating, the vehicle will not be able to advance through a car wash installation utilizing the washer units disclosed in the Hanna patent.

A serious shortcoming of certain prior washer units is that vehicles can not advance past such washer units if the rotary brush is not rotating. It is highly desirable that a car washing system be able to continue to pass vehicles through the system even if one of the rotary brushes fails. Ordinarily, there are employees at car wash installations, which employees vacuum and dust the interior of the vehicle and also "touch up" portions of the exterior by hand scrubbing. If one rotary brush fails, the employees can scrub the surfaces usually scrubbed by the temporarily inoperative rotary brush, and the car wash installation system can be kept profitably running even though one rotary brush is temporarily inoperative. It is obviously very costly to have to shut down a complete car wash installation just because one rotary brush fails. The losses could be very high if repairmen are not immediately available or if repair parts are not immediately available.

It is therefore an object of the invention to provide a car washing system and method which permits vehicles being washed to advance through the system even if the main rotary brush is inoperative.

The main rotary brushes are generally sufficiently wide to wash the front end, lower side panels, and rear end of the vehicle as it advances through the car wash installation. Certain known car wash installations utilize "windmill brushes", which are disposed axially perpendicularly to the main rotary brushes. Such windmill brushes are commonly mounted in a fixed position such that they wash the upper sides, including the door windows of the vehicle as it passes through the car wash installation. The windmill brushes normally rotate clockwise on the right side of the vehicle and counterclockwise on the left side of the vehicle to avoid snagging radio antennas. However, the known windmill brushes are mounted in a fixed position, and do not scrub the sides of narrow cars as effectively as wide vehicles.

It is therefore another object of the invention to provide an improved windmill brush system which more effectively washes the upper sides of vehicles advancing through a car wash installation.

SUMMARY OF THE INVENTION

Briefly described, and in accordance with one embodiment thereof, the invention provides an improved wrap around system and method for washing a slowly advancing vehicle by applying a first rotational force in a first direction to an outer arm supporting a rotary brush at one end, to maintain predetermined crush pressures of the rotary brush against predetermined surfaces of the vehicle. The outer arm is pivotally connected to a free end of an inner arm. The inner arm is pivotally connected to a support. A second rotational force is applied in the first direction to the inner arm to position the inner arm in a maximum knuckled configuration with respect to the outer arm as the rotary brush scrubs a side surface of the vehicle. For a system which can wash the right hand side of the advancing vehicle, the first direction is counterclockwise and the second direction is clockwise. Before the advancing vehicle contacts the rotary brush, which rotates clockwise, the outer arm is in its maximum counterclockwise position with respect to the inner arm. The inner arm is in its maximum clockwise position with respect to the support. The first rotational force is applied by means of a first pressurized pneumatic cylinder having a gear rack driving a rotary gear connected to the outer arm. A second pneumatic cylinder maintains the inner arm in its maximum clockwise configuration. The front of the vehicle brushes against the rotary brush, rotating the outer arm clockwise, rotating a cam coaxially mounted with the rotary gear. The cam actuates a valve system which reverses the fluid pressures in the second cylinder. Tending to produce the second rotational force which rotates the inner arm counterclockwise. The second rotational force is resisted by a clockwise force produced on the outer arm by the advancing vehicle until the rotary brush passes around the front corner of the vehicle. At that point, the inner arm is rotated counterclockwise until a stop bracket contacts a compression spring, at which point the inner arm has rotated approximately 100 degrees from its initial position. The pressure in the first cylinder is reduced to provide a crush pressure adequate to uniformly wash the sides of the car despite variations and contours thereof. When the rotary brush begins passing around the rear corner of the car, the rotary brush "bites" into the rear corner, transmitting a rearward force along the outer arm and rotating the inner arm counterclockwise against the compression spring. The change in direction of frictional force between the surface of the car and the rotary brush is detected by a control valve which actuates a four-way directional valve, reversing the fluid pressures applied to the second pneumatic cylinder, thereby producing a clockwise rotary rotational force on the inner arm. As the rotary brush passes around the rear corner of the vehicle, the compression spring boosts the inner arm rotation in a clockwise direction, forcing the rotary brush against the rear of the vehicle. The second pneumatic cylinder then causes clockwise rotation of the inner arm, which causes at least a predetermined crush pressure to be maintained against the rear end of the vehicle as the outer arm rotates clockwise to sweep the rotary brush across the rear of the vehicle.

The counterclockwise rotation of the outer arm is constrained by a telescoping radius rod connected between an intermediate point of the outer arm and a point of the support spaced from a pivotal connecting point of the inner arm to the support, forming a modified parallelogram structure which limits the rate at which the rotary brush sweeps across the rear of the vehicle as a function of forward progress of the vehicle.

A windmill rotary brush is supported by the free end of the outer arm. The windmill brush rotates in a clockwise direction to wash the upper windows and panels of the vehicle without snagging any radio antennas of the vehicle as the rotary brush scrubs the lower right hand side of the vehicle.

DESCRIPTION OF THE INVENTION

Figure 1:
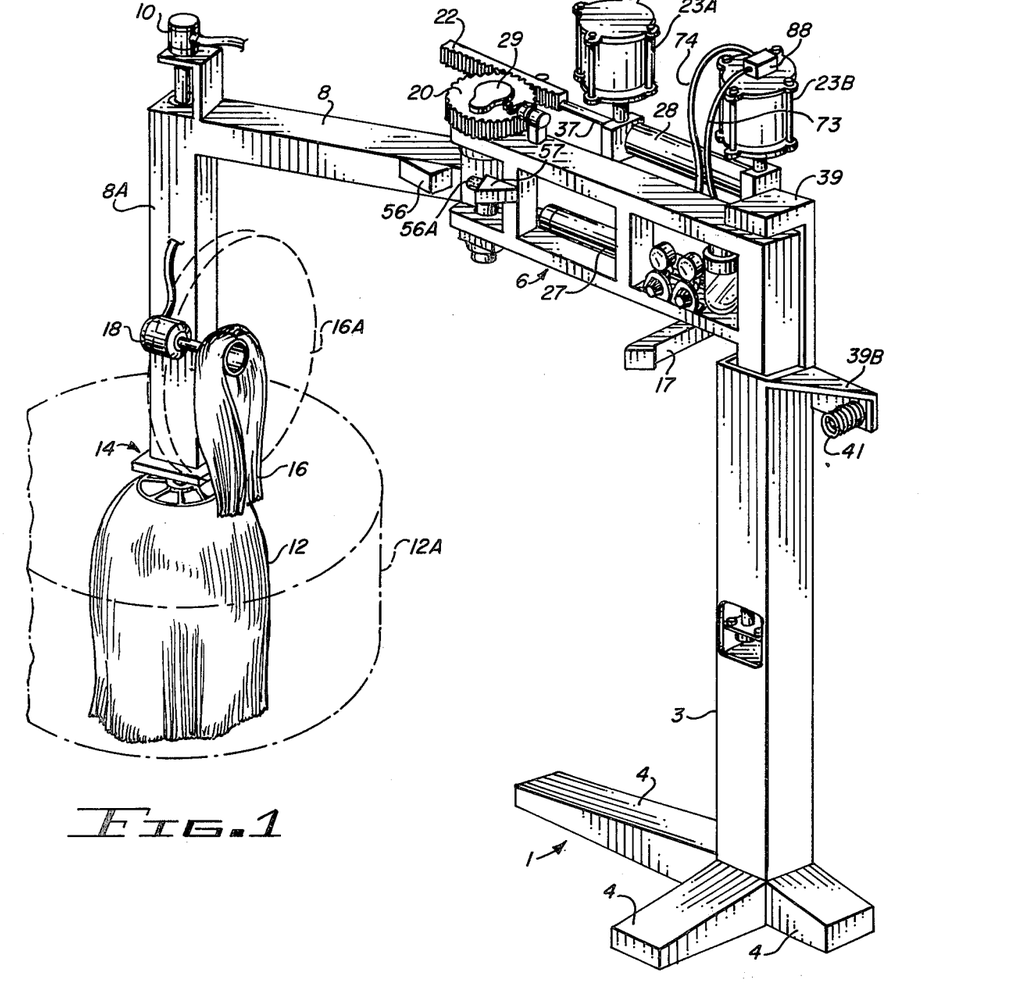
FIG. 1 is a perspective view of a car washing system according to the invention.

Referring now to FIG. 1, car washer system 1 includes a vertical member 3 supported by three horizontal members generally designated by reference numeral 4.

Figures 2, 3, 4:
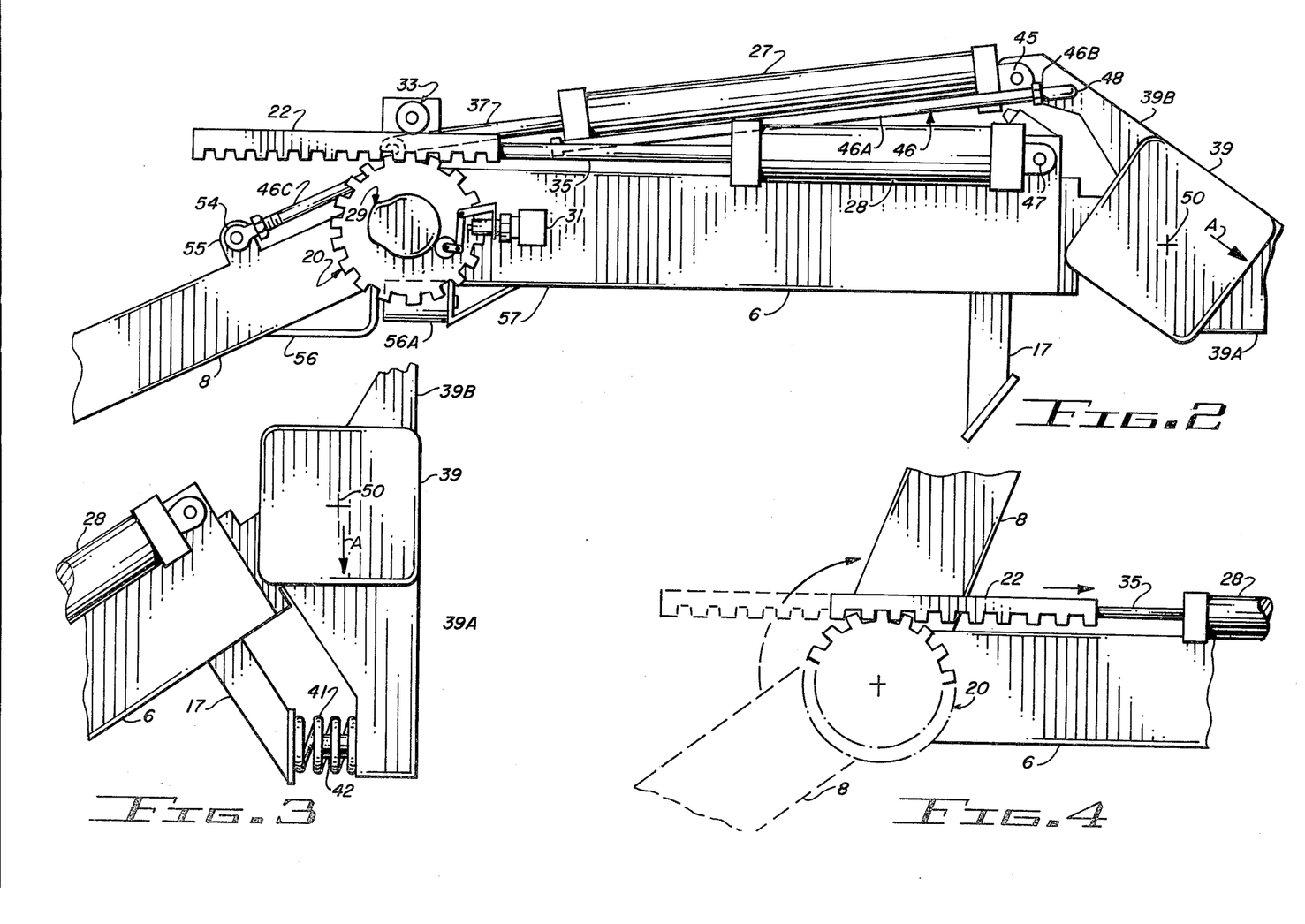
FIG. 2 is a partial view showing details of the inner arm, outer arm, pneumatic cylinders, and support of the car washing system of FIG. 1.
FIG. 3 is a partial top view of the system of FIG. 1 illustrating a stop bracket and compression spring which limit counterclockwise rotation of the inner arm.
FIG. 4 is a partial top view useful in explaining operation of the system of FIG. 1.

Inner or primary arm 6 is pivotally connected to vertical member 3 by means of pivot support member 39. As shown in FIG. 2, the position of inner arm 6 with respect to pivot support member 39 is controlled by inner pneumatic cylinder 27. Pneumatic cylinder 27 is connected between hinge connector 37A of inner arm 6 and arm 39B of pivot support member 39, as also shown in FIG. 2.

Outer or secondary arm 8 is pivotally connected to the swinging end or free end of inner arm 6, as shown in FIGS. 1 and 2. A rotary gear or torque means 20 is axially connected to the pivot end of outer arm 8. Rotary gear 20 is driven by gear rack or force means 22, which in turn is driven by rod 37 of outer cylinder 28. Rotary gear 20 includes a plurality of circumferentially disposed teeth or force receiving points which receive forces from the respective teeth or force transmission points of gear rack 22, thereby producing a controllable torque on outer arm 8. The back end of outer cylinder 28 is connected to the lower end of inner arm 6 at point 47. According to the present invention, several constant oil pressures are maintained in the back end of outer cylinder 28 during several portions of the operating cycle of washer unit 1, as subsequently explained. The oil pressure is maintained by air pressure in oil reservoir 23B. The air pressure in oil reservoir 23B is maintained by means of shuttle valve 88 and air pressure in tubes 73 and 74, subsequently described. A one-way check valve (not shown) causes outer cylinder 28 to act as a shock absorber with respect to abrupt clockwise rotation of outer arm 8, thereby resisting sudden clockwise rotation of outer arm 8; such sudden clockwise rotation can be produced by a vehicle lurching forward and bumping rotary brush 12. This prevents outer arm 8 from swinging too far counterclockwise as a result of being bumped by forward lurching of a vehicle.

Gear rack 22 is maintained in intermeshing engagement with rotary gear 20 by means of roller 33 attached to inner arm 6.

Cam 29 is axially mounted with rotary gear 20, and actuates one way actuator 31 to control the direction of force produced by inner cylinder 28, as subsequently explained.

Still referring to FIG. 2, stop bracket 27 is attached to inner arm 6, and stop bracket 56 is attached to outer arm 8. Rubber stop 56A is attached to stop bracket 57, and limits counterclockwise rotation of outer arm 8 with respect to inner arm 6 by abutting stop bracket 56. The configuration of outer arm 8 and inner arm 6 wherein rubber stop 56A abutts stop bracket 56 is referred to herein as the "neutral" configuration. In the absence of crush force on rotary brush 12, rubber stop 56A is held against stop bracket 56 by the above-mentioned constant counterclockwise torque produced on outer arm 8 by cylinder 28.

A telescoping rod 46 includes an outer housing 46A, a first end 46B connected to arm 39B by hinge 48, and a second end 46C hingably connected by means of hinge 54 and tab 55 to outer arm 8. Telescoping arm 46 operates to limit relative rotation of inner arm 6 and outer arm 8 during washing of the rear of a vehicle, as subsequently explained.

Referring to FIG. 3, a compression spring 41 is mounted on an arm 39A, which is rigidly attached to support member 3. A rubber stop 42 is positioned on arm 39A inside of compression spring 41. Stop bracket 17 is rigidly attached to inner arm 6, and abutts compression spring 41 in the manner shown in FIG. 3 during part of the car washing sequence, as subsequently explained with respect to FIG. 5D.

FIG. 4 illustrates the manner wherein gear rack 22 and rotary gear 20 interact as outer arm 8 is rotated clockwise in response to pressure applied to rotary brush 12 by the front of advancing vehicle 66.

Referring again to FIG. 1, a vertical member 8A is rigidly attached to the swinging outer end of outer arm 8. Vertical member 8A supports main rotary brush 12 and windmill rotary brush 16. When rotary brush 12 is rotated clockwise by hydraulic motor 10, the strands of rotary brush 12 are centrigually extended outward so that rotary brush 12 assumes a cylindrical configuration, as indicated by dotted lines 12A. Similarly, the strands of windmill brush 16, when powered by hydraulic motor 18 to rotate clockwise, assume a flat cylindrical shape, as indicated by reference numeral 16A.

Figure 6:
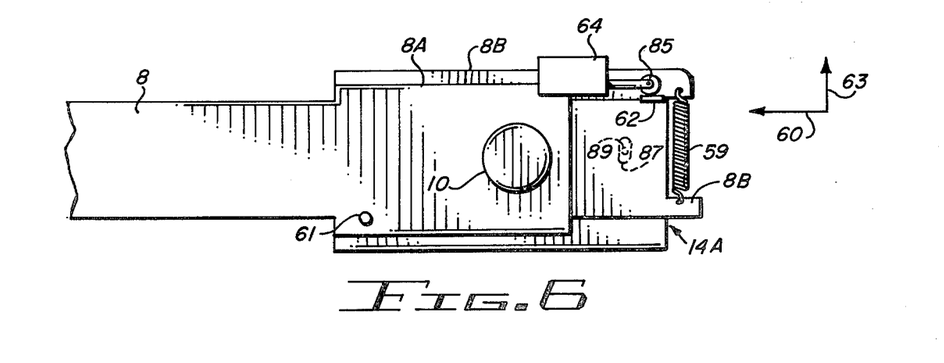
FIG. 6 is a partial top view diagram illustrating a support plate mechanism of FIG. 1 for detecting change in direction of frictional force between a rotary brush and the surface of the vehicle being washed.

A frictional force direction sensing mechanism 14 is mounted on the lower end of vertical member 8A, and is described in more detail with reference to FIG. 6. Referring now to FIG. 6, direction sensing apparatus 14 includes an upper plate 8B rigidly attached to vertical member 8A. A lower plate 14A is pivotally and slidably attached to upper plate 8B by means of pivot connector 61. A control valve 64 is rigidly attached to top plate 8B. A stop 62 is rigidly attached to sliding bottom plate 14A. Top plate 8B and bottom plate 14A are connected by spring 59, such that roller 85 of valve 64 does not contact stop 62. Spring 59 maintains stop 62 against the edge of upper plate 8B. As subsequently explained, when rotary brush 12 passes around the rear corner of vehicle 66 the frictional force between the rotary brush and the surface of the vehicle being washed changes direction from the direction indicated by arrow 60 to the direction indicated by arrow 63 in FIG. 6. This causes stop 62 to depress actuator roller 85, opening valve 64, and causing air pressure to be released from the back end of inner cylinder 27 and applied to rod end of cylinder 27, as subsequently explained. A peg 89 in upper plate 8B extends into an elongated opening 87 in bottom plate 14A to limit the displacement of stop 62 against actuator roller 85.

It should be noted that the car washer system 1 as shown in the drawings washes the right hand side of a vehicle; a similar car washer system is ordinarily positioned on the opposite side of a typical car wash installation to simultaneously wash the left hand side of the vehicle.

Figures 5A, 5D:
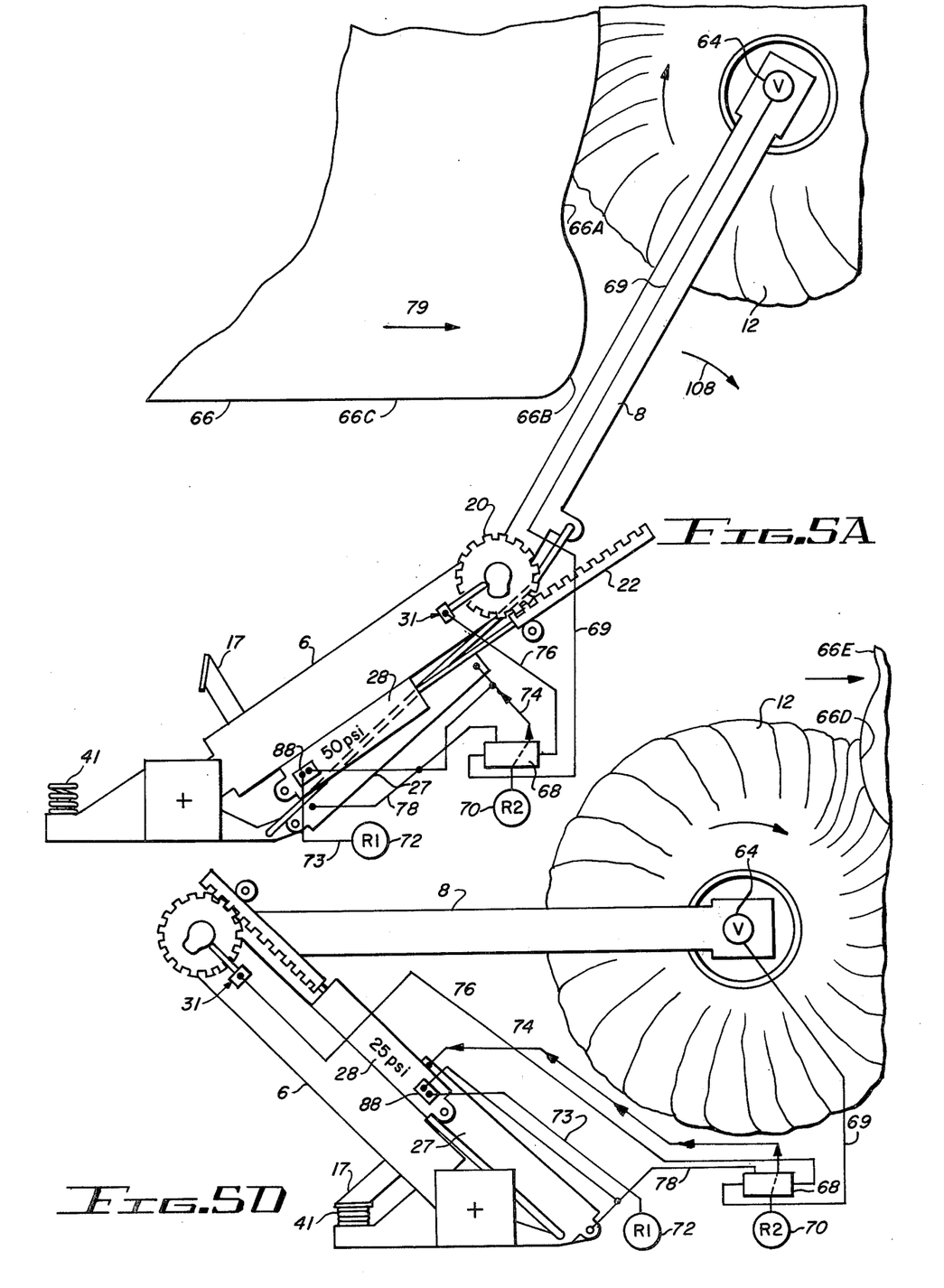
FIGS. 5A–5F constitute a sequence of top view diagrams illustrating various configurations of the system of FIG. 1 as a vehicle advances past the system of FIG. 1.

The operation of the car wash system of FIGS. 1-4 is best understood by reference to FIGS. 5A-5F, which include a sequence of diagrams illustrating the movement of the various parts of car wash system 1 as a vehicle 66 slowly advances past it in the direction indicated by arrow 79 in FIG. 5A. It should be noted that FIGS. 5A-5E show top view diagrams illustrating the configurations of inner arm 6, outer arm 8, rotary brush 12, vehicle 66, and certain other elements of car wash system 1 described above. FIGS. 5A-5F also schematically show a fluid flow system for controlling outer cylinder 28 in response to a regulator 72 and for controlling inner cylinder 27 in response to valves 31 and 64, pilot-activated valve 68, and regulator 70.

Referring not to FIG. 5A, the front surface 66A of advancing vehicle 66 is shown pushing against rotary brush 12. The crush pressure produced on rotary brush 12 by front surface 66A is increased, to counteract a first constant torque applied to rotary gear 20 by outer cylinder 8. Outer arm 8 begins to rotate clockwise, as indicated by arrow 108. When outer arm 8 has rotated approximately 10°, the raised portion 29A of cam 29 actuates a one-way actuator of valve 31. Valve 31 is a one-way valve, model 125MOC, manufactured by Humphrey Valve Co.

It should be noted that FIGS. 5A–5F each show a pilot-actuated four-way valve designated by reference numeral 68, two air pressure regulators 70 and 72, and shuttle valve 88, which maintains the greater of the air pressures in tubes 73 and 74 within oil reservoir 23B of FIG. 1. (Oil reservoir 23B is omitted from FIGS. 5A–5F for clarity.) Regulator 72 is a relief-type regulator which applies a regulated air pressure to the back end of upper cylinder 28. The regulated air pressure supplied to tube 73 by regulator 72 is the greater of the pressure in tube 78 or a regulated valve of approximately twenty-five pounds per square inch. The pressure in tube 78 is either approximately zero or fifty pounds per square inch, depending on the state of pilot-actuated four-way valve 68. Both reliefing regulators and shuttle valves are well known to those skilled in the art. The output of shuttle valve 88 is connected to the back end of cylinder 28. Pilot actuated four-way valve 68, which can be a model 23-40-20 manufactured by Kay Pneumatics Corporation, has two output ports, one connected by a pneumatic tube, represented by line 74, to the rod end of cylinder 27 and the other connected by means of a tube, represented by line 78, to the back end of inner cylinder 27.

In FIGS. 5A–5F, the arrows along the tubes indicate which of the tubes have high pressure therein, and also indicate the direction of air flow therein. Pilot-actuated four-way valve 68 has two pilot inputs, one connected to tube 76, which is also connected to valve 31. The other pilot input is connected by means of tube 69, which is controlled by valve 64.

FIG. 5A indicates that the rod end of cylinder 27 has high air pressure applied thereto, as indicated by the arrows shown along tube 74. This high pressure maintains inner arm 6 in its maximum clockwise configuration, approximately 55° from a line perpendicular to the direction of travel of vehicle 66. Meanwhile, a first constant counterclockwise torque is produced on outer arm 8, thereby maintaining constant crush pressure, by means of the constant pressure of approximately fifty pounds per square inch produced by regulator 70, through four-way valve 68 and shuttle valve 88, which pressure produced an outward force on gear rack 22, which is transmitted by rotary gear 20 to outer arm 8.

Figure 5B:
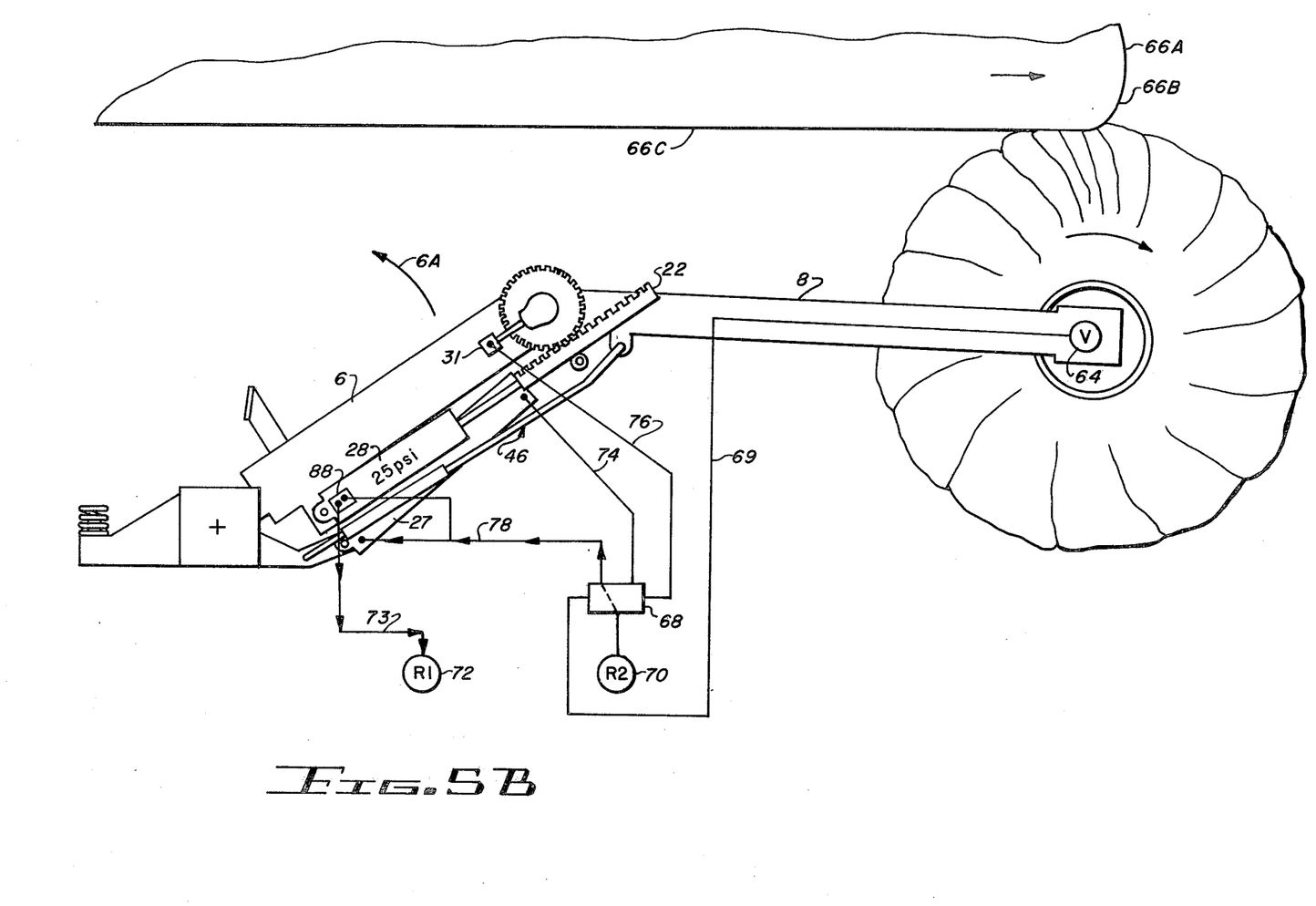

After outer arm 8 has rotated approximately 10°, thereby opening valve 31, the pressure in tube 76 increases, causing pilot-actuated four-way valve 68 to relieve the pressure in tube 74 and to apply the pressure regulated by regulator 70 to tube 78, thereby producing a high pressure in the back end of lower cylinder 27. This latter high pressure produces a counterclockwise torque on inner arm 6. However, such counterclockwise torque on inner arm 6 is "overpowered" by a clockwise component of force produced on inner arm 6 by the force caused on outer arm 8 by the forward movement of vehicle 66 pushing against rotary brush 12. Inner arm 6 remains in its maximum clockwise position or initial forward position until rotary brush 12 passes around front corner 66B of vehicle 66, and outer arm 8 continues to rotate clockwise until the configuration shown in FIG. 5B is attained.

As the piston of cylinder 28 is forced inward by the clockwise rotation of outer arm 8, regulator 72 releases an amount of compressed air necessary to maintain the pressure in the bottom end of outer cylinder 28 constant. After rotary brush 12 completes passing around front corner 66B of vehicle 66, the clockwise component of torque applied on inner arm 6 by rotary brush 12 via outer arm 8 is no longer present. At this point, the air pressure in the back end of cylinder 27 is sufficient to rotate inner arm 6 counterclockwise, as indicated by the arrow 6A in FIG. 5B. Valve 31 remains open until the one-way actuator roller of valve 31 rides off of the raised portion 29A of cam 29.

Figure 5C:
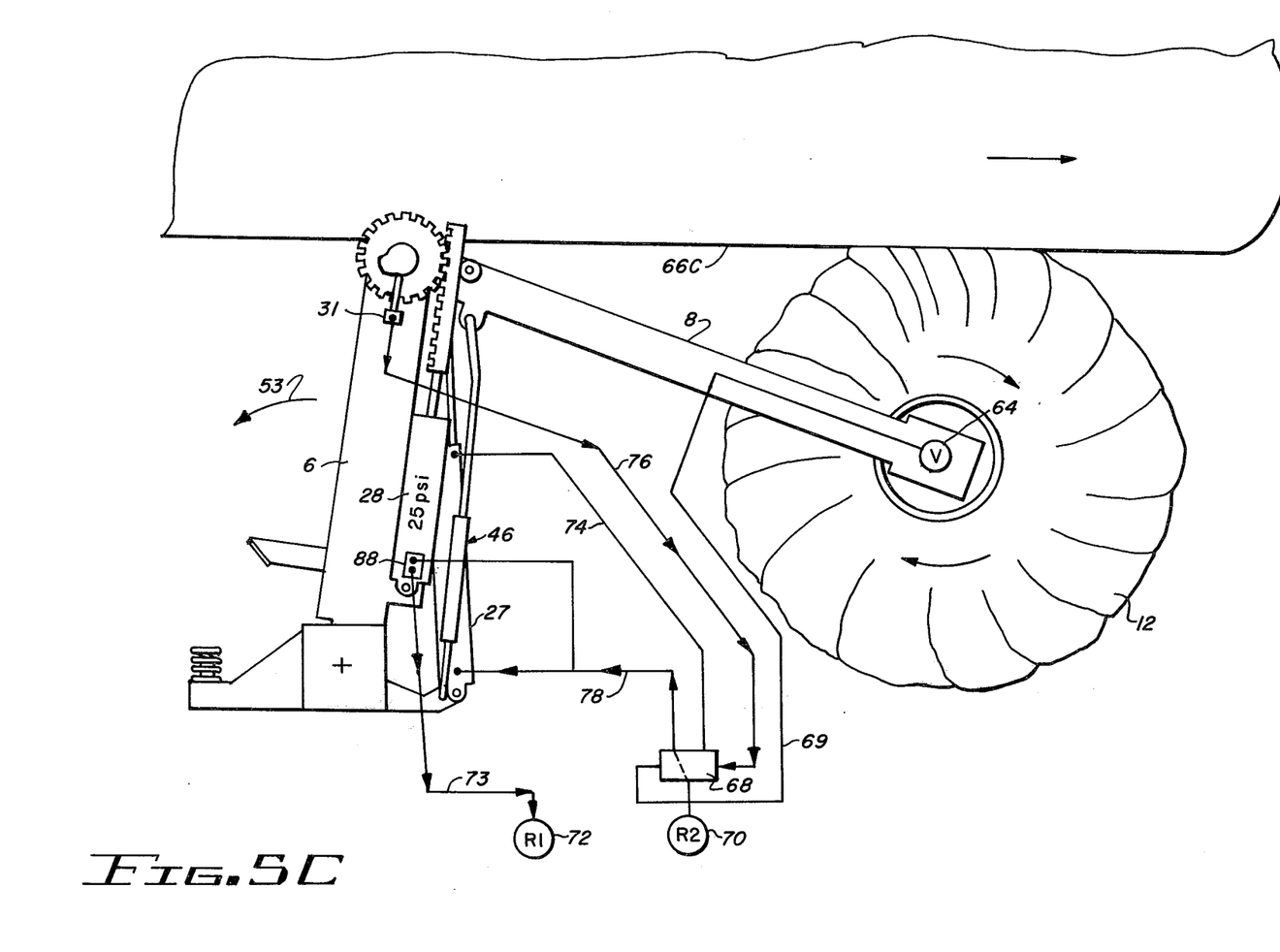

FIG. 5C shows the configuration of car washing system 1 in an intermediate configuration as inner arm 6 rotates counterclockwise, as indicated by arrow 53, until inner arm 6 attains a rearward position when stop bracket 17 contacts compression spring 41.

It may be noted that the one-way actuator roller of valve 31 rides onto the high portion 29A of cam 29, opening valve 31 and holding valve 31 open until the roller of the one-way actuator rides down from the high portion of cam 29, thereby closing valve 32. However, when outer arm 8 again rotates counterclockwise with respect to inner arm 6, as described with respect to FIGS. 5C–5E, the roller again rides up the high portion of cam 29, but does not open valve 31. Valve 31 remains closed until the front of the next vehicle to be washed pushes outer arm 8 clockwise through the previously mentioned 10° angle, causing the roller to again ride onto high portion 29A of cam 29.

It should also be noted that the rod side of pneumatic cylinder 28 contains oil, which is drawn therein from oil reservoir 23A (FIG. 1) by means of a one-way check valve (not shown, but well known in the art) as gear rack 22 is pushed toward cylinder 28 as outer arm 8 rotates clockwise with respect to inner arm 6. When outer arm 8 rotates counterclockwise, as described subsequently with respect to FIGS. 5C–5F, the oil in the rod end of upper cylinder 28 causes upper cylinder 28 to act as a shock absorber with respect to abrupt counterclockwise rotation of outer arm 8. This action prevents abrupt rotation of outer arm 8 in the counterclockwise direction as rotary brush 12 "bites" abruptly into rear corner 66D of automobile 66 as rotary brush 12 passes around rear corner 66D.

By the time inner arm 6 has completed the counterclockwise rotation indicated by arrow 53 in FIG. 5D, stop bracket 17 has contacted compression spring 41, as indicated in FIG. 5D. At this point, the inner arm stop 17 has contacted compression spring 41, but has not yet compressed it. Inner arm 6 and outer arm 8 are now referred to as being in their "maximum knuckled" configuration; outer arm 8 has rotated through approximately 170° with respect to inner arm 6 during the sequence of operations described thus far.

Immediately prior to the point at which rotary brush 12 begins to pass around rear corner 66D of vehicle 66, the counteraction on sliding bottom plate 14B of FIG. 6 produced by the frictional force resulting from the clockwise rotation of rotary brush 12 produces a longitudinal force component (indicated by arrow 60 in FIG. 6) along the axis of outer arm 8. Consequently, valve 64 remains closed up to this point, since the tension of spring 59 is sufficiently strong to prevent stop 62 from pressing against roller 85, which, then displaced by stop 62, opens valve 64.

Figures 5E, 5F:
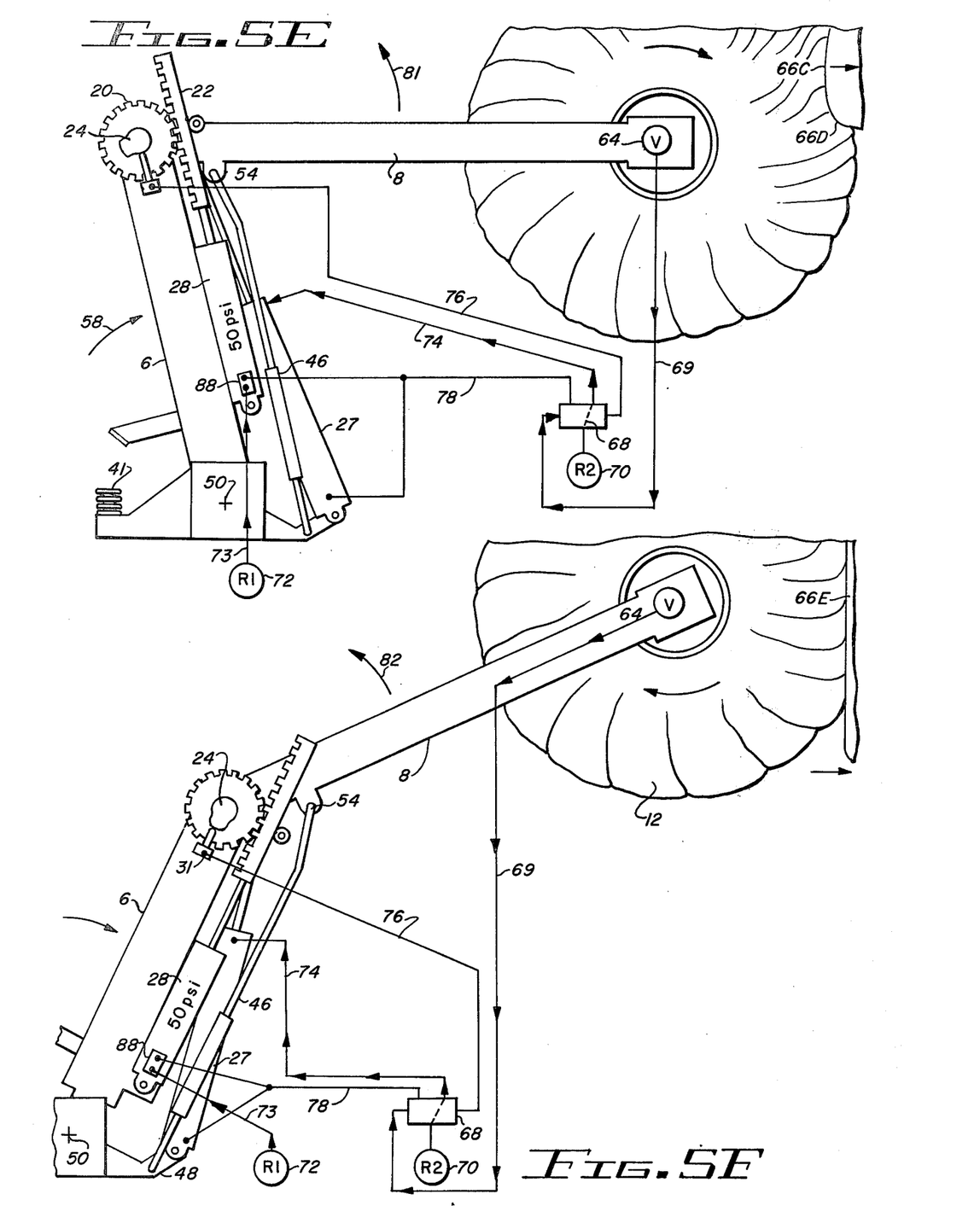

Referring now to FIG. 5E, rotary brush 12 has begun to "bite" into rear corner 66D. This produces the transverse force component (indicated by arrow 63 in FIG. 6) on bottom plate 14A, causing stop 62 to move against roller 67, expanding spring 59 slightly, and opening valve 64, as explained previously. The opening of valve 64 produces a "pulse" of air pressure in pneumatic tube 69, as indicated by the arrows on pneumatic tube 69 of FIG. 5E. This switches the pressure from regulator 70 from pneumatic tube 78 to pneumatic tube 74, producing high pressure in the rod end of cylinder 27. Further, the high pressure in the back end of cylinder 27 is released via an exhaust port (not shown, but well known to those skilled in the art) of pilot-actuated four-way valve 68. Thus, a clockwise rotation force is applied to inner arm 6 as a result of the opening of valve 64 caused by the rounding of rear corner 66D by rotary brush 12.

At the same time that rotary brush 12 begins biting into rear corner 66D, an abrupt compression of the fibers or strands of rotary brush 12 occurs, producing a momentarily greatly increased crush pressure. This increased crush pressure produces an abrupt longitudinal rearward force on outer arm 8, and rotating inner arm 6 further counterclockwise, causing stop bracket 17 to compress compression spring 41. Excess shock to the car wash system 1 as rotary brush 12 bites into and passes around rear corner 66D of vehicle 66 is thereby avoided. As soon as the rotary brush 12 passes around a point of maximum compression while passing around rear corner 66D, energy absorbed by compression spring 41 is released, giving inner arm 6 a sharp clockwise boost, as indicated by arrow 58 in FIG. 5E. At this point, rear surface 66E of vehicle 66 is "retreating" with respect to rotary brush 12, and the sudden clockwise "boost" produced by the release of energy in compressed spring 41 assists the clockwise rotational force produced by lower cylinder 27 in causing rotary brush 12 to "chase" the retreating rear surface 66E. A sufficiently large crush pressure to ensure adequate scrubbing of rear surface 66E is thereby maintained immediately after rotary brush 12 passes around rear corner 66D. By referring to FIGS. 5D-5F, it can be seen that the previously defined chase distance is determined by the clockwise rotational angle through which inner arm 6 rotates from its maximum knuckled configuration (previously defined) and the length of inner arm 6. By beginning the chase portion of the operation at the maximum knuckled configuration of inner arm 6 and outer arm 8 as shown in FIG. 5D, a long chase distance is achieved. The chase distance of the described car washing system is approximately twice that of any prior car wash system, and permitting scrubbing action by the rotary brush for a longer time.

Referring now to FIG. 5E, after rotary brush 12 has passed around rear corner 66D, the frictional force of rotary brush 12 against rear end 66E of vehicle 66 causes rotary brush 12 to tend to "walk across" rear end 66E, producing a counterclockwise rotational force on outer arm 8, which force adds to the counterclockwise rotational force produced on outer arm 8 by the above-described cooperation of cylinder 28, rack 22 and rotary gear 20.

At this point, inner arm 6 has moved into the configuration indicated in FIG. 5E, and continues rotating clockwise at a rate determined by the forward velocity of vheicle 66. At this point, telescoping radius rod 46 is in its maximum extended configuration, and acts to limit the rate at which rotary brush 12 sweeps across rear end 66E of vehicle 66, as now explained. It can be seen that the line segments connecting pivot points 24, 54, 48, and 50 in FIG. 5E approximately form a parallelogram, referred to herein as a "modified parallelogram". Since telescoping radius rod 46 is in its maximum extended configuration, it tends to prevent outer arm 8 from rotating counterclockwise (as indicated by arrow 81 in FIG. 5E) with respect to inner arm 6 in response to the torque applied to rotary gear 20 by gear rack 22. However, as cylinder 27 causes inner arm 6 to rotate clockwise to maintain adequate crush pressure of rotary brush 12 against retreating rear end 66E of vehicle 66, it may be seen, by visualizing what changes occur in the modified parallelogram configuration, that radius rod 46 permits outer arm 8 to sweep across the rear end of retreating vehicle 66, as indicated by arrow 82 in FIG. 5F. The distance between pivot points 50 and 48 and the distance between pivot points 24 and 54 are chosen such that rotary brush 12 sweeps across and scrubs the desired portion of rear end 66E by the time vehicle 66 advances far enough to permit inner arm 6 to reach its maximum clockwise position. In the described embodiment of the invention, the distance between pivot points 24 and 54 is approximately six inches and the distance between pivot points 48 and 50 is approximately eight inches. The maximum clockwise position of inner arm 6 is reached when bracket 56 of outer arm 6 contacts rubber stop 56A, as indicated in FIG. 2. (The bend shown in rod 46C of telescoping radius rod 46 is necessary to permit outer arm 8 to rotate sufficiently counterclockwise to attain the neutral position shown in FIG. 2.)

FIG. 5F shows an intermediate configuration of inner arm 6 and outer arm 8 during the "chasing" and scrubbing of rear end 66E by rotary brush 12. At the completion of the process of washing rear end 66E, the washing system 1 is again in its neutral position, and is ready to begin washing another vehicle.

It should be noted that the above-described cooperation of telescoping radius rod 46 with outer arm 8 and inner arm 6 to limit the counterclockwise rotation of outer arm 8 during the "chase" portion of the car washing operation is an important feature of the invention, because if outer arm 8 were permitted to rapidly rotate counterclockwise after rotary brush 12 passes around the rear corner 66D, inadequate washing of the rear of the vehicle would result. (Although the above-described shock absorber action of the oil filled rod end of outer cylinder 28 also opposes counterclockwise rotation during the "chase" portion of the washing operation, such shock absorber action does not provide the degree of control provided by the parallelogram-like action of radius rod 46.)

An important feature of the described car wash system is that the mechanism will function to permit a vehicle to advance in the normal manner even if rotary brush 12 is not rotating for some reason, such a failure of motor 10. Valves 31 and 64 nevertheless will be activated, causing inner arm 6 to pivot clockwise and counterclockwise at the appropriate times independently of the frictional force between rotary brush 12 and vehicle 66. Operation of cylinder 27 and inner arm 6 are therefore substantially independent of variations in frictional force between rotary brush 12 and vehicle 66.

The described car wash system is substantially less complex and massive than prior systems. The single upright member 3 is simpler, occupies less space, and is less expensive than prior web type washer unit supporting structures. The controls include only a cam, two pneumatic switches, two regulators and a pilot-activated four-way control valve. Only two pneumatic cylinders are utilized. Consequently, the initial costs and the maintenance costs are low.

Although the invention has been described herein with reference to a particular embodiment thereof, those skilled in the art will recognize that various modifications can be made within the scope of the invention. For example, instead of using gear rack 22 for applying torque to rotary gear 20, a chain could be connected to both rods of a double rod type pneumatic cylinder. Or, alternatively, rotary gear 20 could be replaced by a pulley and torque could be applied to the pulley by various belt arrangements. As another example, the compression spring described herein could be replaced by more complex mechanisms for absorbing shock as the rotary brush bites into the rear corner of the vehicle and sharply boosting the rotation of the inner arm to thrust the rotary brush against the rear surface of the vehicle immediately after the rotary brush rounds the rear corner of the vehicle. As yet another example, various alternate means other than pneumatic cylinder 27 can be utilized for rotating the inner arm between its forward position and its rearward position.

I claim:

1. Apparatus for scrubbing portions of the front, side, and rear surfaces of a vehicle as said vehicle advances in a forward direction through a car wash installation, said apparatus comprising in combination:
   (a) a primary arm pivotally mounted on a support for rotation between an initial forward position and a rearward position, said primary arm being directed generally in said forward direction when said primary arm is in said initial forward position, said primary arm being directed generally in the direction opposite to said forward direction when said primary arm is in said rearward position;
   (b) a secondary arm pivotally mounted on said primary arm;
   (c) a rotary brush mounted on said secondary arm for scrubbing the surfaces of said vehicle;
   (d) torque means for receiving forces and converting said forces into torque applied to said secondary arm, said torque means including a distributed plurality of circumferential force receiving points;
   (e) force means including a distributed plurality of force transmission points which are engageable with respective ones of said force receiving points of said torque means for transmitting selected forces to said torque means and thereby producing controllable torque on said secondary arm and a corresponding crush pressure between said rotary brush and surfaces of said vehicle;
   (f) first rotation means for rotating said primary arm from said initial forward position toward said rearward position as said rotary brush passes along the side surface of said vehicle; and
   (g) second rotation means for rotating said primary arm from said rearward position toward said forward position as said rotary brush passes across the rear surface of said vehicle, thereby producing a crush pressure between said rotary brush and the rear surface of said vehicle.

2. The apparatus of claim 1 wherein said torque means includes a rotary gear connected to said secondary arm.

3. The apparatus of claim 2 wherein said force means includes:
   (1) a first pneumatic cylinder having a movable rod;
   (2) a gear rack connected to said movable rod;
   (3) wherein said rotary gear includes a plurality of teeth and said gear rack includes a plurality of teeth engageable with respective ones of said rotary gear teeth.

4. The apparatus of claim 3 further including means for controllably applying fluid pressure to said first pneumatic cylinder to apply said selected forces to said gear rack.

5. The apparatus of claim 4 wherein said first and second means include a second pneumatic cylinder having one end connected to said support and another end connected to said primary arm.

6. The apparatus of claim 1 further including means for absorbing rotational displacement of said primary arm caused by biting of said rotary brush into the rear corner of said vehicle as said rotary brush passes around the rear corner of said vehicle.

7. The apparatus of claim 6 wherein said absorbing means includes a spring mounted on said support and a member attached to said primary arm for depressing said spring when said primary arm receives a rotational force produced by said biting of said rotary brush into the rear corner of said vehicle.

8. The apparatus of claim 1 further including first detecting means for detecting passing of said rotary brush around the rear corner of said vehicle in response to a predetermined change in direction of force produced on said secondary arm by said rotary brush as said rotary brush passes around the rear corner of said vehicle.

9. The apparatus of claim 8 further including:
   (a) second detecting means for detecting a predetermined amount of rotation of said secondary arm as said rotary brush passes along the front surface of said vehicle; and
   (b) control means for causing said first rotation means to rotate said primary arm from said initial forward position to said rearward position in response to said second detecting means and causing said second rotation means to rotate said primary arm from said rearward position to said forward position in response to said first detecting means.

10. The apparatus of claim 1 further including limiting means responsive to forward movement of the rear surface of said vehicle for limiting the rotation rate of said secondary arm as said rotary brush passes across the rear surface of said vehicle, said limiting means limiting said rotation rate as a function of the rate of forward movement the rear surface of said vehicle as said vehicle advances.

11. The apparatus of claim 10 wherein said secondary arm includes an intermediate point located between the points at which said secondary arm is connected to said primary arm and said rotary brush, wherein said limiting means includes chord means connected between said support and said intermediate point for limiting said rotation rate of said secondary arm to a rate corresponding to a rotation rate of said primary arm as said primary arm is rotated from said rearward position to said forward position.

12. The apparatus of claim 11 wherein said limiting means includes telescoping means having a maximum extended configuration connected between said intermediate point and a point of said support spaced from the point at which said primary arm is connected to said support for limiting said rotation rate of said primary arm when said telescoping means is in said maximum extended configuration.

13. A method for scrubbing portions of the front, side, and rear surfaces of a vehicle as the vehicle advances in a forward direction through a car wash installation which includes
  i. a primary arm pivotally mounted on a support for rotation between an initial forward position and a rearward position, said primary arm having a directional component in said forward direction when said primary arm is in said initial forward position, said primary arm being directed generally in the direction opposite to said forward direction when said primary arm is in said rearward position,
  ii. a secondary arm pivotally mounted on the primary arm,
  iii. a rotary brush mounted on the outer arm for scrubbing the surface of the vehicle, said method comprising the steps of:
  (a) sequentially applying control forces to a plurality of distributed force transmission points which are engageable with respective ones of a plurality of distributed circumferential force receiving points of a torque element connected to the outer arm, thereby producing a controllable torque on the secondary arm and a corresponding crush pressure between the rotary brush and surfaces of the vehicle;
  (b) rotating the primary arm from said initial forward position toward said rearward position as the rotary brush passes along the side surface of the vehicle; and
  (c) rotating the primary arm from said rearward position toward said forward position as the rotary brush passes along the rear surface of the vehicle, thereby producing a crush pressure between the rotary brush and the rear surface of the vehicle.

14. The method of claim 13 wherein said applying of said control forces includes applying a force to teeth of a rotary gear connected to the secondary arm by means of teeth of a gear rack.

15. The method of claim 14 further including the step of absorbing rotational displacement of the primary arm produced by biting of the rotary brush into the rear corner of the vehicle as the rotary brush passes around the rear corner of the vehicle.

16. The method of claim 15 including storing energy absorbed during said absorbing and further including releasing of said stored energy to effect a portion of said rotating of the primary arm during step (c).

17. The method of claim 13 further including rotating the secondary arm in response to said torque to move the rotary brush across the rear surface of the vehicle, and limiting the rate of said rotation of the secondary arm in accordance with the rate of said rotating of the primary arm during step (c).

18. An apparatus for washing front, side, and rear surfaces of a vehicle as said vehicle advances through a car wash installation, said apparatus comprising in combination:
  (a) a rotary brush;
  (b) means for rotating said rotary brush;
  (c) a support;
  (d) a primary arm pivotally connected to said support;
  (e) a secondary arm pivotally connected to said primary arm for supporting said rotary brush; and
  (f) connecting means for pivotally connecting an intermediate point of said secondary arm to a second stationary point of said support and maintaining said intermediate point at a fixed predetermined distance from said second stationary point as said rotary brush passes across the rear surface of said vehicle as said vehicle advances, said connecting means causing the rate of rotation of said secondary arm to be a predetermined function of the rate of rotation of said primary arm as said rotary brush passes across the rear surface of said vehicle as said vehicle advances, the rate of rotation of said primary arm being determined by the rate of forward movement of the rear surface of said vehicle.

* * * * *